United States Patent [19]

Anderson

[11] 3,938,558
[45] Feb. 17, 1976

[54] FLEXIBLE CYLINDRICAL METAL TUBE
[75] Inventor: Leroy E. Anderson, Detroit Lakes, Minn.
[73] Assignee: Manufacturers Systems, Inc., Detroit Lakes, Minn.
[22] Filed: Oct. 26, 1973
[21] Appl. No.: 410,234

[52] U.S. Cl. ................. 138/122; 138/135; 138/155
[51] Int. Cl.² ..................... F16L 11/00; F16L 11/16
[58] Field of Search ........... 138/135, 122, 155, 156, 138/163, 167, 168

[56] References Cited
UNITED STATES PATENTS

| | | | |
|---|---|---|---|
| 3,331,400 | 7/1967 | Vilkaitis | 138/135 |
| 3,435,852 | 4/1969 | Trihey | 138/122 |
| 3,682,203 | 8/1972 | Foti et al. | 138/135 |

*Primary Examiner*—Richard E. Aegerter
*Assistant Examiner*—James E. Bryant, III
*Attorney, Agent, or Firm*—Schroeder, Siegfried, Ryan & Vidas

[57] ABSTRACT

Corrugated, flexible, metal duct formed of a helically wound strip of lightweight metal characterized by a pair of interlocked U-shaped seam elements which constitute one leg of a common corrugation of contiguous convolutions of the strip and extend radially throughout the length of that leg so that the areas at the base of each U-shaped seam element abuts against the adjacent corrugation leg and is locked against separation thereby. Apparatus which makes such duct through the use of rollers only and void of any mandrel means is also shown.

8 Claims, 18 Drawing Figures

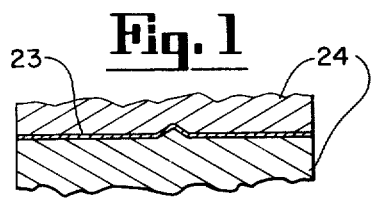
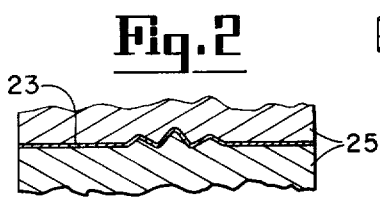
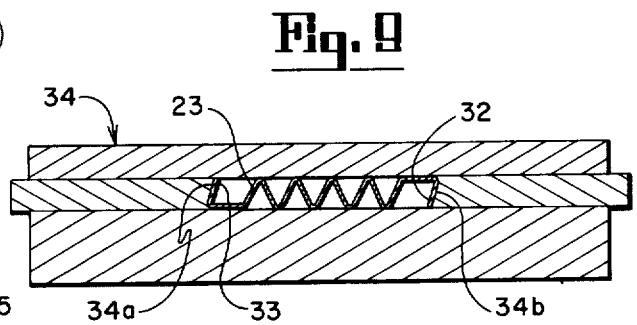
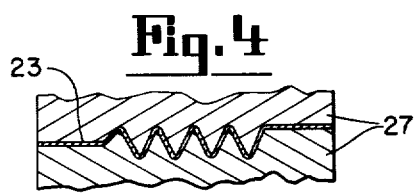
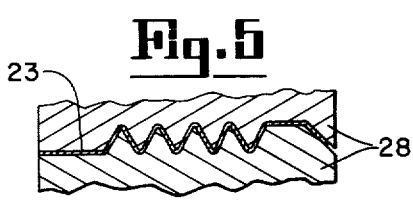
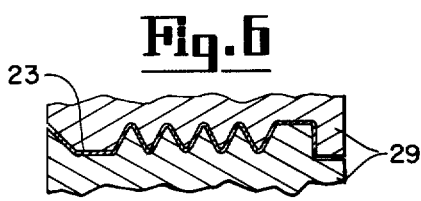
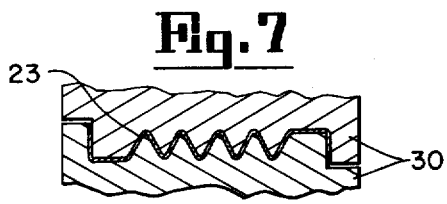
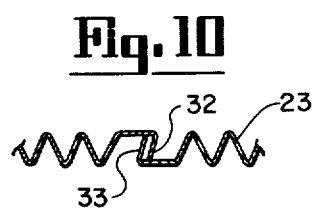
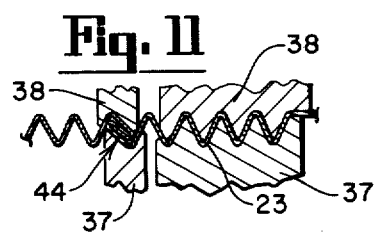
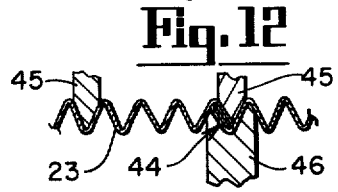
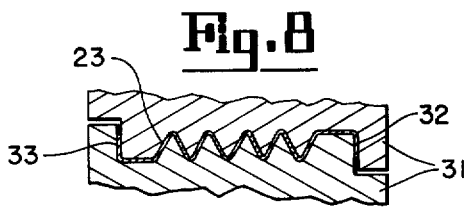
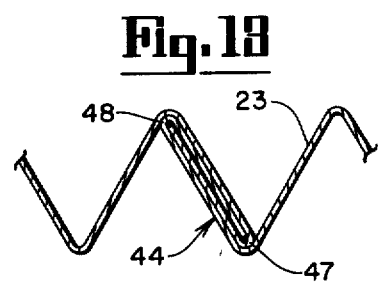

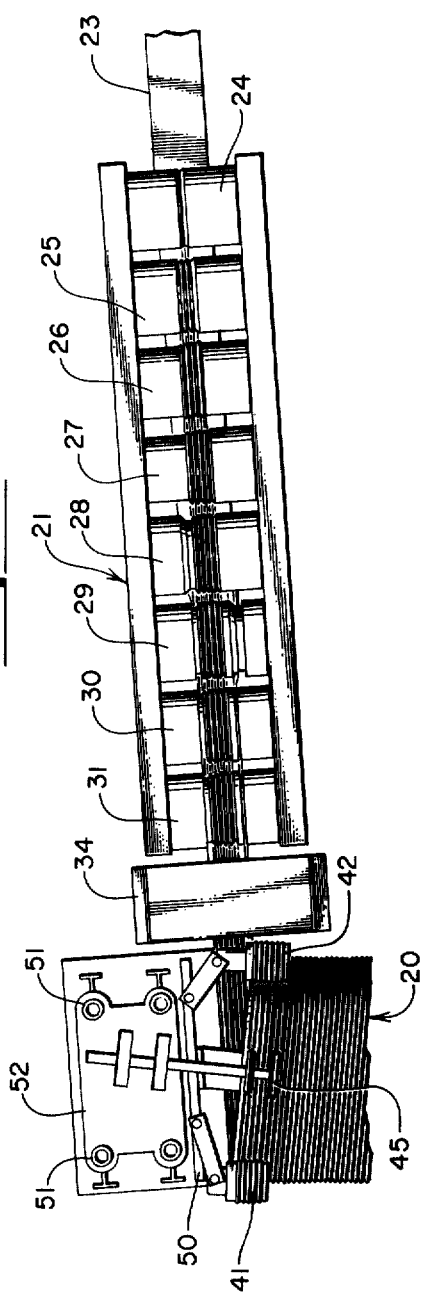
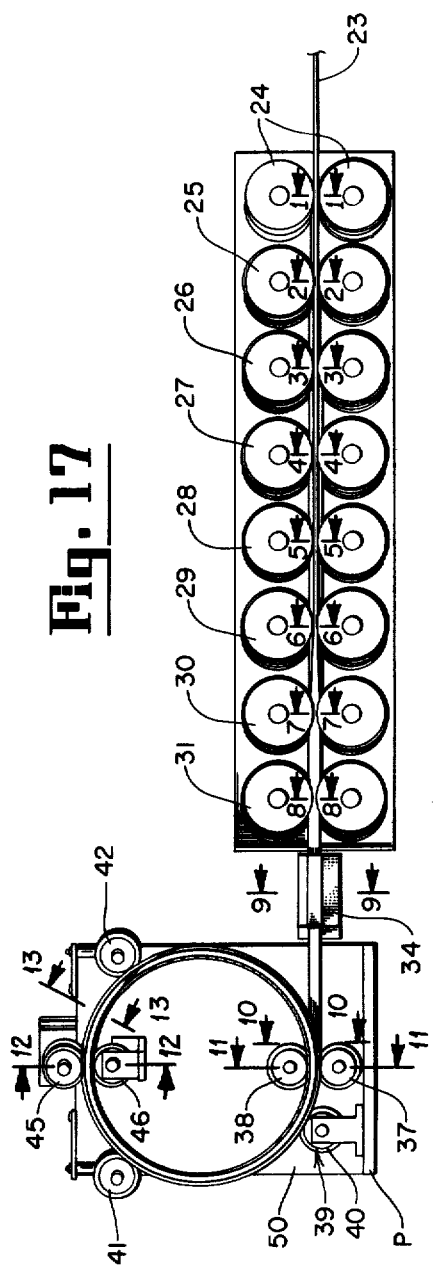
Fig. 16
Fig. 17

FLEXIBLE CYLINDRICAL METAL TUBE

This invention relates to corrugated flexible, cylindrical ducts. More particularly, it relates to a corrugated, flexible, cylindrical duct made from a single strip of metal and having interlocking seam structures so constructed and arranged as to preclude separation of the adjacent convolutions of the metal strip through either axial compression or tension. It also relates to apparatus for making such a duct which is characterized by the absence of any mandrel means.

There is a very substantial need for flexible metal ducts which can be manufactured of very lightweight metal such as aluminum of light gauge which can be bent about a sharp radius and cannot be readily separated at the seams thereof through either axial compression or tension. There is a substantial need for such a duct in the heating industry as well as in the automobile industry, and many other industries in which duct is required to be bent or flexed about sharp corners for any one of a number of reasons. The invention described herein discloses and claims a corrugated, flexible metal duct made of such material, and having seam structure so constructed and arranged as to permit flexing or bending about a relatively small radius and offering substantially greater resistance to separation at the seam thereof as the result of axial compression or tension than similar duct as heretofore known.

The advantages of flexible duct are well-known. The advantages of metal flexible duct are particularly desirable in view of the resistance of the metal to heat and other physical conditions which tend to weaken or destroy the duct. The light weight and durability of metal such as light gauge aluminum makes such duct particularly attractive, but its acceptance has been hindered and inhibited because of the tendency of the seams made from such material to separate upon appreciable axial tension and particularly axial compression.

It is a general object of my invention to provide an improved corrugated, flexible, cylindrical metal duct having improved features with respect to flexibility and durability because of its unique seam structure.

A further object is to provide a machine constructed and arranged to manufacture such a duct in a simple, inexpensive and rapid manner from a single strip of lightweight metal such as light gauge aluminum.

A more specific object is to provide a novel and highly improved corrugated, flexible, cylindrical metal duct having seam structure which constitutes one leg of a common corrugation of contiguous convolutions of the strip of metal from which the duct is made, the axis of the seam extending parallel to that leg to thereby facilitate flexing of the duct. A still more specific object is to provide an improved cylindrical duct made from a single strip of sheet metal in which the contiguous convolutions of the helically wound strip are connected by a seam comprised of two interlocked U-shaped seam elements, the areas of these elements at the base thereof abutting against the adjacent leg of the adjacent corrugation of the contiguous convolution of the strip so as to lock the seam against separation as a result of axial compression.

Another object is to provide a machine for making a cylindrical, corrugated, flexible metal duct from a single strip of sheet metal by helically winding the latter and forming an interlocked seam constituting a common leg of a corrugation and extending throughout the length of that leg, the machine being characterized by the absence of a mandrel.

Another object is to provide a machine constructed and arranged to form a corrugated, flexible, cylindrical metal duct from a single strip of light gauge sheet metal in which the formation of the helically wound duct is accomplished through the use of only a plurality of rollers and a single fixed die member.

These and other objects and advantages of the invention will more fully appear from the following description, made in connection with the accompanying drawings, wherein like reference characters refer to the same or similar parts throughout the several views, and in which:

FIG. 1 is a schematic fragmentary sectional view taken through the rollers which initially engage the strip of metal and form the first corrugation therein;

FIG. 2 is a schematic fragmentary sectional view showing the construction of the second set of rollers which engage the strip of metal and the shape into which the strip is formed thereby;

FIG. 3 is a schematic fragmentary sectional view taken through the third set of rollers encountered by the strip of metal in the machine and showing the corrugations induced therein thereby;

FIG. 4 is a schematic fragmentary sectional view of the fourth set of rollers through which the strip of metal pases as it moves through the machine and showing the corrugations induced thereby;

FIG. 5 is a schematic fragmentary sectional view of the fifth set of rollers which work the strip of metal as it passes through the machine, showing the corrugations therein and the initial step in the formation of a seam element from the marginal portions of the strip;

FIG. 6 is a schematic fragmentary sectional view of the sixth set of rollers through which the strip of metal passes as it moves through the machine and showing the completion of one of the seam elements at one side of the strip and the initial step in the formation of the seam element at the opposite side of the strip.

FIG. 7 is a schematic fragmentary sectional view showing the seventh set of rollers through which the strip of metal passes as it moves through the machine and illustrating the next step in the formation of the strip;

FIG. 8 is a schematic fragmentary sectional view of the eighth set of rollers encountered by the strip of metal as it moves through the machine and showing completion of the corrugations and the seam elements in the strip;

FIG. 9 is a vertical sectional view on enlarged scale taken through the fixed die member which provides the final shaping to the seam elements preparatory to the passage of the metal strip through the forming rolls;

FIG. 10 is a schematic view illustrating the co-relation of the strip and a contiguous convolution immediately after it is initially shaped and prior to the initial seam forming operation;

FIG. 11 is a schematic sectional view of the strip and contiguous convolution shown in FIG. 10 immediately after it has passed through the initial seam forming operation;

FIG. 12 is a schematic sectional view taken through the same strip and contiguous convolution as shown in FIGS. 10 and 11 immediately after the final seam forming operation performed by the finishing rolls;

FIG. 13 is a schematic sectional view taken on an enlarged scale through the seam of a portion of the spiral duct after it has been formed and showing the seam of FIG. 12 on an enlarged scale;

FIG. 16 is a fragmentary top plan view of the machine which is utilized to produce the duct shown in FIGS. 1–14;

FIG. 17 is a diagrammatic front elevational view of the machine shown in FIG. 15 for clarification.

Figure 18:
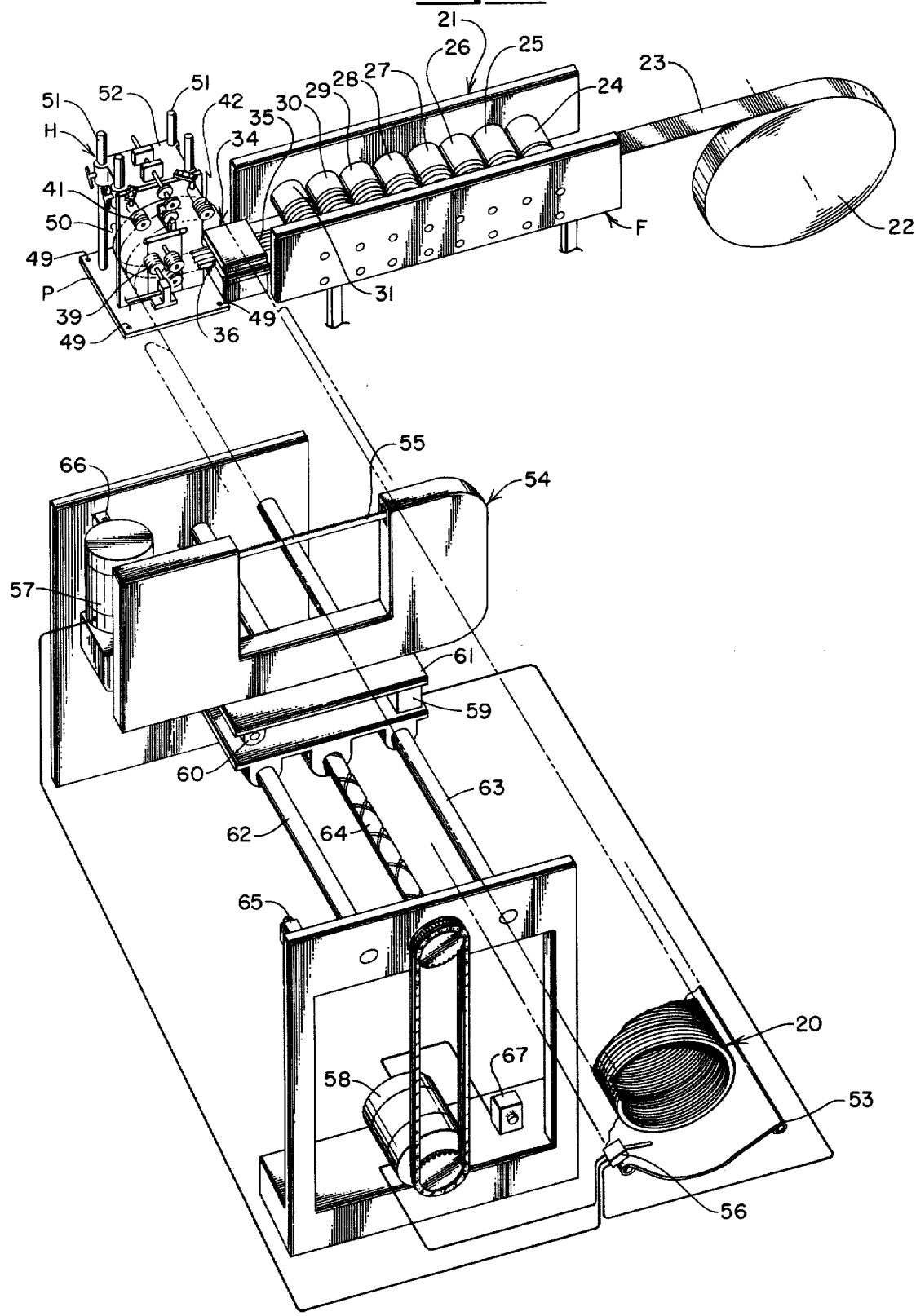
FIG. 18 is a diagrammatic perspective view of the machine utilized to produce the duct shown in FIGS. 1–14

As shown in FIG. 18, the spiral duct 20 is formed upon a machine indicated generally at 21 from a roll 22 of a strip 23 of metal such as light gauge aluminum. The strip 23 is first passed through eight separate pairs of corrugating rollers indicated by the numerals 24–31 inclusive. The first pair of rollers 24 induce an initial corrugation at the center of the strip 23 as shown in FIG. 1. The second set of rollers 25 produce a deformity at either side of the central corrugation as shown in FIG. 2. The third set of rollers 26 complete the two corrugations at either side of the central corrugation and further deform the strip initially immediately outwardly therefrom as shown in FIG. 3.

The fourth set of rollers, as shown in FIG. 4 complete the corrugations initiated by the rollers 26 (as shown in FIG. 3). This completes the forming of the corrugations in the strip of metal 23. The pairs of rollers 28, 29, 30 and 31 in FIGS. 5–8 inclusive further deform the strip of metal 23 to produce seam elements 32 and 33 on the opposite side edge portions of the strip. It will be noted that the two seam elements 32, 33 extend in opposite directions and are supported by supporting structure which extends parallel to the general plane of the strip but at the opposite ends of the corrugation so that they are vertically spaced as the strip 23 leaves the pair of rollers 31. It will be noted that the rollers 24–31 are rotatably mounted in sequence upon a frame indicated by the letter F.

Also mounted upon the frame F immediately behind the rollers 31 and receiving the strip 23 therefrom is a fixed die member indicated generally by the numeral 34. This die member 34 is tunnel-like in structure and, accordingly, has an entrance 35 and an exit 36. The side walls 34a and 34b thereof are vertical at the entrance 35 so as to receive the vertically extending seam elements 32 and 33 without difficulty. The side walls 34a and 34b, however, converge inwardly toward the exit 36 to the position and relationship shown in FIG. 9 so that as the metal strip 23 passes through the die 34, the seam element 33 is bent inwardly and the downwardly extending seam element 32 is likewise bent inwardly as shown. Thus, the side wall 34a converges inwardly and upwardly, while the side wall 34b converges inwardly and downwardly from the entrance toward the exit.

As the metal strip 23 is driven by the powered rolls 24–31 inclusive through the die 34 and leaves the exit 36 thereof, it passes between a pair of powered rolls 37–38 as shown in FIGS. 15–18 inclusive. The details of these rolls can best be seen in FIG. 11. These rolls 37–38 aid in moving the strip 23 forward to engage a rotatably mounted curvature inducing roller 39. It will be noted that this roller 39 is mounted directly ahead of the two rollers 37 and 38 but in slightly elevated relation thereto so that its strip engaging surface 40 is vertically displayed from the plane of the metal strip 23 as it passes between the rollers 37–38. This surface 40 induces a curvature into the metal strip 23 causing it to move upwardly to a point where it is engaged by the rotatably mounted rollers 41 and 42 which continue to direct the metal strip in a cylindrical helical path. It will be noted that each of the rollers 37–38 and 41–42 have corrugations formed theron which correspond and compliment the corrugation induced in the strip 23 by the rollers 24–31 inclusive so as to facilitate the direction and movement of the strip therethrough and thereby.

Figure 14:
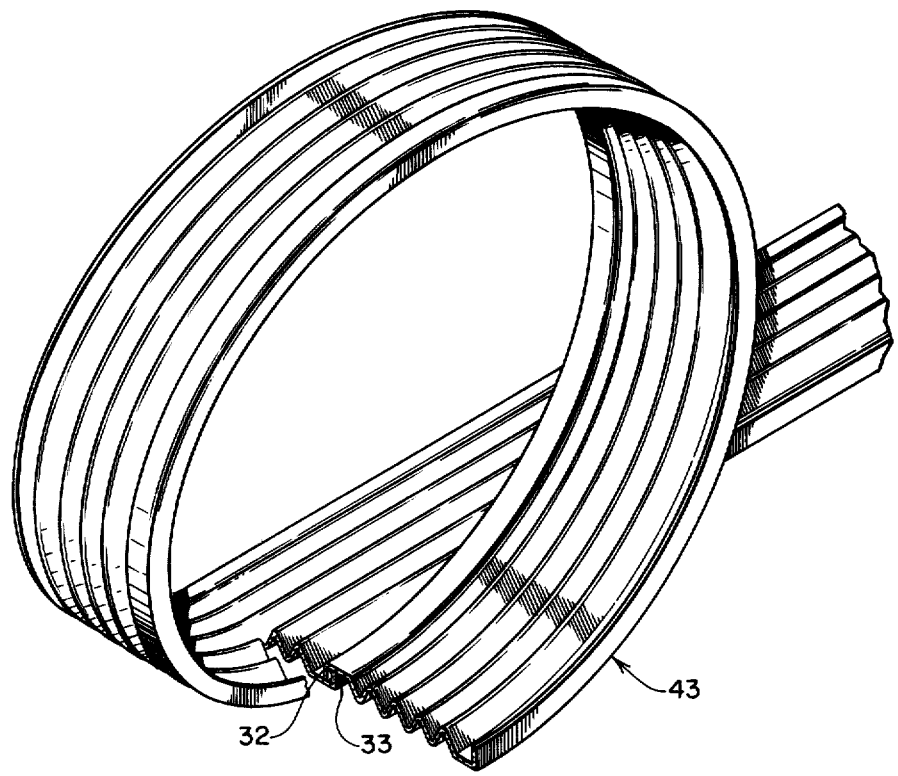
FIG. 14 is a pictoral view in perspective illustrating the manner in which a metal strip is directed into a spiral shape and the seam element of the initial convolution thereof is presented and disposed within the seam element at the opposite side of the strip just prior to being presented to the seam forming rollers.

As the strip is continued to be powered through the machine by the rollers 24–31 and 37–38 and continues to be curved and directed in a spiral path by the rollers 39, 41 and 42, it progresses to a point where the initial convolution 43 engages the strip 23 as best illustrated in FIG. 14 and FIG. 10. It will be noted by reference to these figures that the seam element 32 is brought downwardly so as to overlap and extend just inwardly of the upstanding seam element 33 of the strip 23. Thus the two seam elements are brought into overlapping position preparatory to the formation of the seam, the initial step of which is illustrated in FIG. 11, and is accomplished by the free end portions of the rollers 37–38 which, it will be noted by reference to FIG. 11, are provided with a cooperative rib and groove which is somewhat wider than the ribs and grooves of these rolls which compliment the corrugations of the strip 23. As the strip 23 and the initial convolution 43 move through the outer end portions of the rollers 37 and 38 the seam element 32 is reversed upon its supporting structure as is the seam element 33 to produce a seam indicated generally by the numeral 44. This seam 44 extends initially at an angle of approximately 30° off horizontal, as shown in FIG. 11. It will be noted that it consists of a pair of U-shaped seam elements produced by the reversal of the elements 32–33 upon their supporting structure so that the element 33 extends into the U-shaped seam element formed by the element 32 and its supporting structure and vice versa.

As the first convolution 43 moves along with the strip 23 upwardly, the seam 44 which connects the two passes between a pair of rotatably mounted finishing rollers 45, 46 which are also powered and complete the seam 44 by compressing the same and causing it to extend at an angle of approximately 70° to the horizontal or general plane of the strip 23. It will be noted that when so formed the seam 44 constitutes a common leg of adjacent corrugations at either side thereof and that it extends throughout the length of that leg. It will also be noted that the point of juncture of the two legs of each of the U-shaped seam elements abuts against the adjacent leg of the adjacent corrugation. This can best be seen by reference to FIG. 13 where the point of juncture of the two legs of the U-shaped seam element which includes the element 33 abuts against the adjacent leg at the point indicated by the numeral 47, and the U-shaped seam element which includes the element 32 abuts against the adjacent leg at the point indicated in FIG. 13 by the numeral 48. Thus, the adjacent legs of the adjacent or contiguous corrugation in each instance locks the two U-shaped seam elements together so that they cannot be separated by either axial compression or tension. I have found that this structure is particularly effective in preventing separation of the seam in readily deformable metal such as light gauge aluminum. I have also found that by forming the seam as best shown in FIG. 13 so as to extend parallel to the leg of the corrugation, the spiral duct so formed can be bent upon the relatively sharp radius as compared to ducts which are formed with other types of seams where the seam has a component extending parallel to the axis of the duct and tranversely of the leg of the corrugation.

Figure 15:
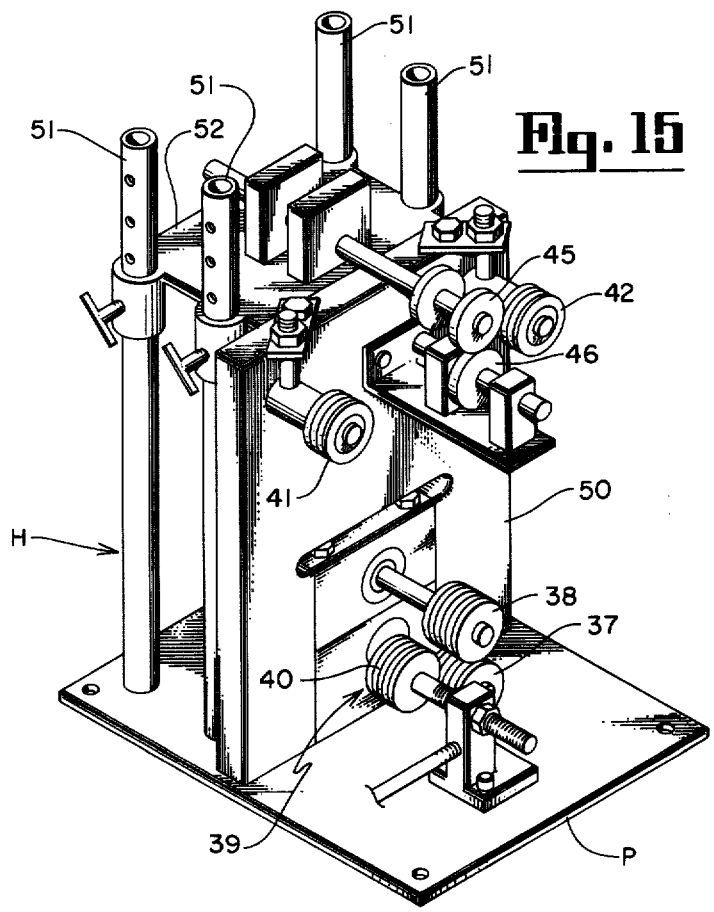
FIG. 15 is a perspective view of the forming head which induces the spiral curvature and forms the seam from the seam elements to produce the spiral duct.

It will be noted that the rollers 37–39, 41, 42, 45 and 46 are all mounted upon a mounting head indicated generally by the letter H, which is best shown in FIG. 15. This mounting head includes a base plate P which is removably mounted upon the frame F by four bolts 49. Mounted upon the base plate P is an upstanding rigid support plate 50 which is disposed adjacent four uprights 51 which in turn support a vertically adjustable bearing 52 which rotatably mounts the powered roller 45. As shown, the roller 46 is mounted upon the support 50 as is each of the powered rollers 37, 38. The roller 39 is rotatably mounted upon the plate P as best shown in FIG. 15.

It will be noted that the rollers 45 and 46 are mounted so that the axis thereof extends at a slight angle to the path of movement of the strip 23 so as to extend parallel to the axis of the spiral duct 20 as it is formed and so as to properly direct the tube 20 and complete the formation of the seam 44. It will likewise be noted that the two rollers 41 and 42 are adjustably mounted on the support 50 and that the axis thereof likewise extends at a slight angle to the support 50 and the direction of movement of the trip 23 so as to direct the first convolution 43 of the strip in a spriral path so that the element 32 will be properly brought into position relative to the element 33 of the strip 23 so as to extend in overlapping relation just inwardly thereof as best shown in FIG. 11. These rollers 41 and 42 are adjustably mounted so as to facilitate adjustment thereof to properly direct the first convolution 43 of the strip so that the duct forming operation may be continuous.

The gear train mechanism for the various driven rollers as hereinbefore described has not been shown since the construction of the same is well known throughout the art, and thus it has been omitted for the sake of brevity.

It will be noted by reference to FIGS. 11–13, that the flexible corrugated cylindrical tube constructed as hereinbefore described is comprised of a helically wound strip of formable material such as light gauge aluminum wherein the strip has longitudinally extending corrugations formed therein and has marginal portions supported at opposite sides thereof and reversed upon itself in opposite directions (elements 32 and 33) to form a U-shaped seam element at each side of the strip. It will also be noted that the free edge of each of these marginal portions (32, 33) is received between the leg of the adjacent seam element of the convolution of the strip which is contiguous thereto. These two U-shaped elements cooperatively define a radially extending seam which constitutes a common leg of a corrugation for the contiguous convolutions of the strip. Moreover, each of the seam elements extend into the bottom of the valley of the adjacent corrugation of the contiguous convolution of the strip and abuts against the other leg of the adjacent corrugation in locked-in relation. Thus, the one U-shaped seam element extends into the valley of the corrugation and abuts at 47 against the adjacent leg of that corrugation and the other seam element extends into the valley of the other corrugation and abuts against the adjacent leg thereof as at 48. Thus each of the seam elements is locked into position by the adjacent leg of the corrugation into the valley of which that seam element extends. It will be noted that the marginal portions of the strip are reversed upon themselves in opposite direction to form the two U-shaped seam elements.

Mounted upon the frame F and extending laterally therefrom is a cut-off table 53 which receives and supports the duct 20 as it is formed. Positioned below the level of the cut-off table and a short distance from the forming head is a cut-off saw assembly 54 which is capable of movement of the saw element 55 upwardly and downwardly through a distance of approximately one and one-half inches vertically relative to the tube 20. When the assembly is in its retracted position the saw element is below the tube, and when the desired length of tube has been formed, it will automatically cut-off the desired length of duct. This is accomplished through the use of a microswitch 56 which is electrically connected with the saw motor 57, a variable speed motor 58, and a solenoid or cylinder 59. The latter functions to elevate the saw assembly 54 by tilting the same about its axis of pivot 60. The microswitch 56 is adjustable to any desired position along the length of the table 53 so that any predetermined lengths of tube may be prepared, the desired length being determined by the distance between the saw assembly 54 in its retracted position and the position of the microswitch 56.

The saw assembly 54 is mounted on the pivoting table 61 which pivots about the axis 60. This pivoting table moves forwardly and backwardly on two roll shafts 62 and 63. It is driven by a level wind screw 64 which, as shown, is driven by the motor 58. A microswitch 65 limits the forward movement of the saw assembly 54, and a stop switch 66 limits the movement of the saw assembly in the opposite direction. A variable speed control box indicated by the numeral 67 controls the speed of the motor 58 as desired. It is desirable to change the speed of this motor in the event a change in the size of the ducts being manufactured is made, for then, of course, the tube will be made at a different number of feet per minute.

When the end of the tube 20 engages the microswitch 56, the latter energizes the motor 57 and the motor 58 which in turn drives the saw and the level wind screw 64. At the same time the solenoid 59 is activated by the microswitch 56 so as to cause the saw assembly 54 to commence to pivot about the pivot 60 and raise the saw element 55 into engagement with the underside of the tube 20. Since the platform 61 is driven by the level winding screw 64, it moves with the duct 20 as the latter progresses along the table 53. The saw element 55 proceeds to cut through the underside of the tube 20, and since the latter is rotating as it leaves the forming head, the entire tube is cut within a distance of approximately 3 or 4 inches. Shortly thereafter the saw assembly engages the microswitch 65 which shuts off the motor 57 and de-energizes the solenoid or cylinder 59 so that the saw table will lower out of cutting position. The motor 58 continues to run and drive the level wind screw so that the saw assembly 54 will return to its original position and thereat trip the microswitch 66 which stops the operation of the motor 58 and its driven level wind screw 64. As soon as the section of the tube 20 has been severed by the saw element 55, the operator lifts and removes the section which has been cut off and the saw assembly remains in position until the next section of duct engages the microswitch 56. At that point the entire procedure will repeat itself. This permits the machine to be operated continuously with only one man required to operate the same, and leaves sufficient time for him to carton the duct for shipment.

It will, of course, be understood that various changes may be made in the form, details, arrangement and proportions of the parts without departing from the scope of the invention which consists of the matter shown and described herein and set forth in the appended claims.

What is claimed is:

1. A corrugated cylindrical tube comprised of a strip of formable material helically wound into contiguous convolutions and defining a tube having adjacent circumferentially extending corrugations therein, said corrugations each having a bottom bounded by opposed radially extending legs, said strip having marginal portions each with a free edge supported at opposite sides thereof and reversed upon itself in opposite directions to form a U-shaped seam element at each side thereof having opposed legs, the free edge of each of said marginal portions being received between the legs of one of said seam elements of the convolution of said strip contiguous thereto and thereby cooperatively defining a radially extending seam and comprising a common leg of a corrugation for the contiguous convolutions of said strip, each of said seam elements extending into the bottom of the adjacent corrugation of the contiguous convolution of said strip and abutting against the other leg of said adjacent corrugation in locked-in relation.

2. A corrugated cylindrical tube comprised of a strip of formable material helically wound into contiguous convolutions and defining a tube having circumferentially extending corrugations therein, said corrugations each having a bottom and being bounded by opposed radially extending legs the radial length of which determine the depth of said corrugations, said strip having marginal portions each with a free edge and being supported at opposite sides of said strip and being turned back into overlying relation to opposite faces of said strip, said free edge of each of said marginal portions being received between the turned back marginal portion of the convolution of said strip contiguous thereto and its supporting structure, and cooperatively defining therewith one leg of a corrugation of the tube and also defining therewith a radially extending seam extending substantially throughout the length of said corrugation leg.

3. The structure defined in claim 2 wherein each of said marginal portions of said strip has a juncture point at which it is supported by the remainder of said strip and wherein each of said marginal portions at its said juncture point is disposed within and bears against the bottom of a corrugation of the convolution of the strip contiguous thereto.

4. The structure defined in claim 2 wherein the structure supporting each of said marginal portions extends to the bottom of a corrugation of a convolution of the strip contiguous thereto and abuts against the same.

5. The structure defined in claim 2 wherein the structure supporting each of said marginal portions of a seam extends to the bottom of a corrugation of the convolution of the strip contiguous thereto and parallel and adjacent to one leg thereof and is prevented from movement relative to the other marginal portion by the opposite leg thereof.

6. The structure defined in claim 2 wherein the supporting structure of each of said marginal portions is carried by a leg of a corrugation of said strip and bears against the corrugation leg of the strip contiguous thereto which carries the other marginal portion.

7. The structure defined in claim 2 wherein said radially extending seam extends at an angle of approximately 70° relative to the axis of the tube.

8. The structure defined in claim 2 wherein the said supporting structure of each of said marginal portions is carried by an adjacent corrugation leg of said strip and said radially extending seam extends between said carrying legs and is locked therebetween thereby.

* * * * *